US008627373B2

(12) United States Patent
Grover et al.

(10) Patent No.: US 8,627,373 B2
(45) Date of Patent: *Jan. 7, 2014

(54) SYSTEM AND METHOD FOR PRESENTING MEDIA SERVICES

(71) Applicant: AT&T Intellectual Property I, LP, Atlanta, GA (US)

(72) Inventors: Nancy Grover, San Diego, CA (US); Edward G. Amoroso, Andover, NJ (US); William O'Hern, Spring Lake, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,605

(22) Filed: Apr. 30, 2013

(65) Prior Publication Data

US 2013/0239139 A1 Sep. 12, 2013

Related U.S. Application Data

(63) Continuation of application No. 11/678,491, filed on Feb. 23, 2007, now Pat. No. 8,453,178.

(51) Int. Cl.
G06F 3/00 (2006.01)
G06F 13/00 (2006.01)
H04N 5/445 (2011.01)

(52) U.S. Cl.
USPC ............ 725/51; 725/14; 725/37; 725/38; 725/39; 725/40; 725/42; 725/61; 725/109; 725/110; 702/14.49

(58) Field of Classification Search
None
See application file for complete search history.

(56) References Cited

U.S. PATENT DOCUMENTS

| 2002/0188944 | A1 | 12/2002 | Noble |
| 2003/0154473 | A1 | 8/2003 | Shin |
| 2004/0078807 | A1* | 4/2004 | Fries et al. ............. 725/14 |
| 2004/0114036 | A1 | 6/2004 | Karaoguz |
| 2005/0120391 | A1* | 6/2005 | Haynie et al. ........... 725/135 |
| 2005/0172317 | A1 | 8/2005 | Jeong |
| 2006/0190966 | A1* | 8/2006 | McKissick et al. ....... 725/61 |
| 2006/0195873 | A1* | 8/2006 | Gopalan et al. .......... 725/100 |
| 2008/0004960 | A1* | 1/2008 | Coomer et al. .......... 705/14 |

FOREIGN PATENT DOCUMENTS

| WO | 98/41020 | 9/1998 |
| WO | 02/03646 | 1/2002 |

OTHER PUBLICATIONS

Ganley, "Copyright and IPTV", Computer Law & Security Report, Elsevier Advance Technology, vol. 23 No. 3, Jan. 1, 2007, pp. 248-261; XP022086993.

* cited by examiner

Primary Examiner — Joshua Taylor
(74) Attorney, Agent, or Firm — Guntin & Gust, PLC; Douglas Schnabel

(57) ABSTRACT

A system and method for presenting media services is disclosed. A system that incorporates teachings of the present disclosure may include, for example, a media system having a controller element that contextually associates a plurality of portals with a corresponding plurality of multimedia broadcast channels as an aggregated service offering. Other embodiments are disclosed.

20 Claims, 4 Drawing Sheets

SYSTEM AND METHOD FOR PRESENTING MEDIA SERVICES

CROSS-REFERENCE TO RELATED APPLICATIONS

This application is a continuation of U.S. patent application Ser. No. 11/678,491 filed Feb. 23, 2007 which is incorporated herein by reference in its entirety.

FIELD OF THE DISCLOSURE

The present disclosure relates generally to media services and more specifically to a system and method for presenting media services.

BACKGROUND

For a period of time it has been possible to browse the Internet on a television set connected to a set-top box with Internet access. Generally, when a user viewing a TV channel (e.g., Nickelodeon™) wants to explore content on the Internet, the user transitions away from the selected channel to another screen with a browser performing navigation tasks. This scenario and the occasional desire of consumers to avoid commercials by scanning other TV channels poses a challenge for broadcast media service providers who want to retain viewership and maintain advertisement revenues as high as possible.

A need therefore arises for a system and method for presenting media services.

DETAILED DESCRIPTION

Embodiments in accordance with the present disclosure provide a system and method for presenting media services.

In a first embodiment of the present disclosure, a computer-readable storage medium in a portal can have computer instructions for presenting at a media system as an aggregated service selectable media services of the portal contextually associated with a multimedia broadcast channel.

In a second embodiment of the present disclosure, a media system can have a controller element that contextually associates a plurality of portals with a corresponding plurality of multimedia broadcast channels as an aggregated service offering.

In a third embodiment of the present disclosure, a method can involve supplying to a media services distributor a portal contextually associated with the multimedia broadcast channel for distribution to media systems as an aggregated service.

In a fourth embodiment of the present disclosure, a method can involve distributing an aggregated service comprising media programs of a multimedia broadcast channel and a portal contextually associated with the multimedia broadcast channel.

Figure 1:
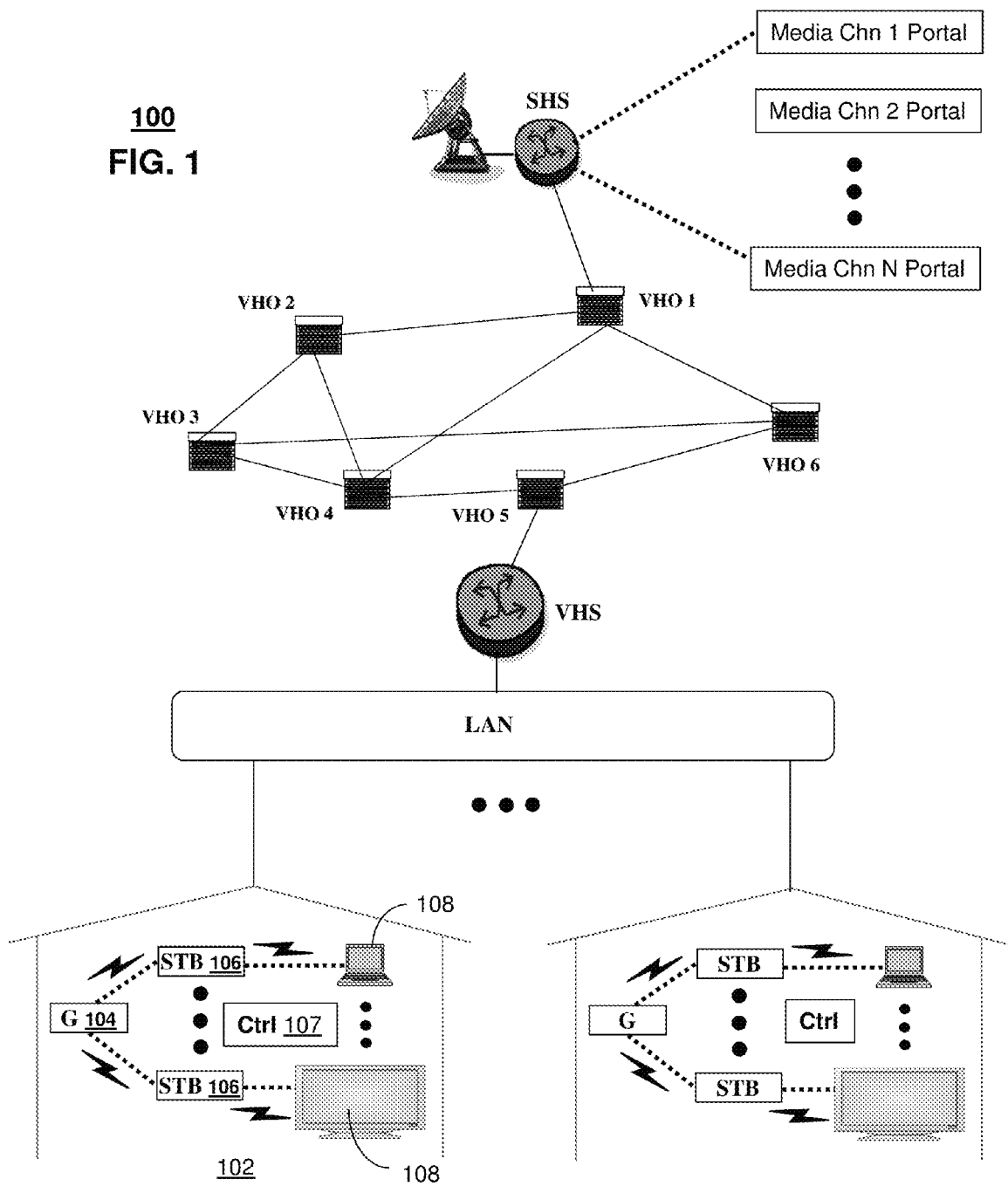
FIG. 1 depicts an exemplary embodiment of a communication system.

FIG. 1 depicts an exemplary embodiment of an IPTV communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG) that distributes broadcast signals to receivers such as Set-Top Boxes (STBs) 108 which in turn present broadcast selections to media devices 108 such as computers or television units managed in some instances by a media controller 107 (e.g., an infrared or RF remote control).

Unicast traffic can also be exchanged between the STBs 108 and the subsystems of the IPTV communication system 100 for services such as video-on-demand (VoD). Although not shown, the aforementioned multimedia system can also be combined with analog broadcast distributions systems.

To enhance user experience, the service providers of the broadcast channels supply multimedia service portals to the communication system 100. In the present illustration, the portals are supplied to the SHS. However, the portals can also be introduced at other IPTV subsystems such as the VHO, VHS, LAN, RG 104, STB 106, media device 108, or media controller 107 by way of an IP network associated with the communication system 100. Each of these portals is contextually associated with a select multimedia broadcast channel.

Figure 2:
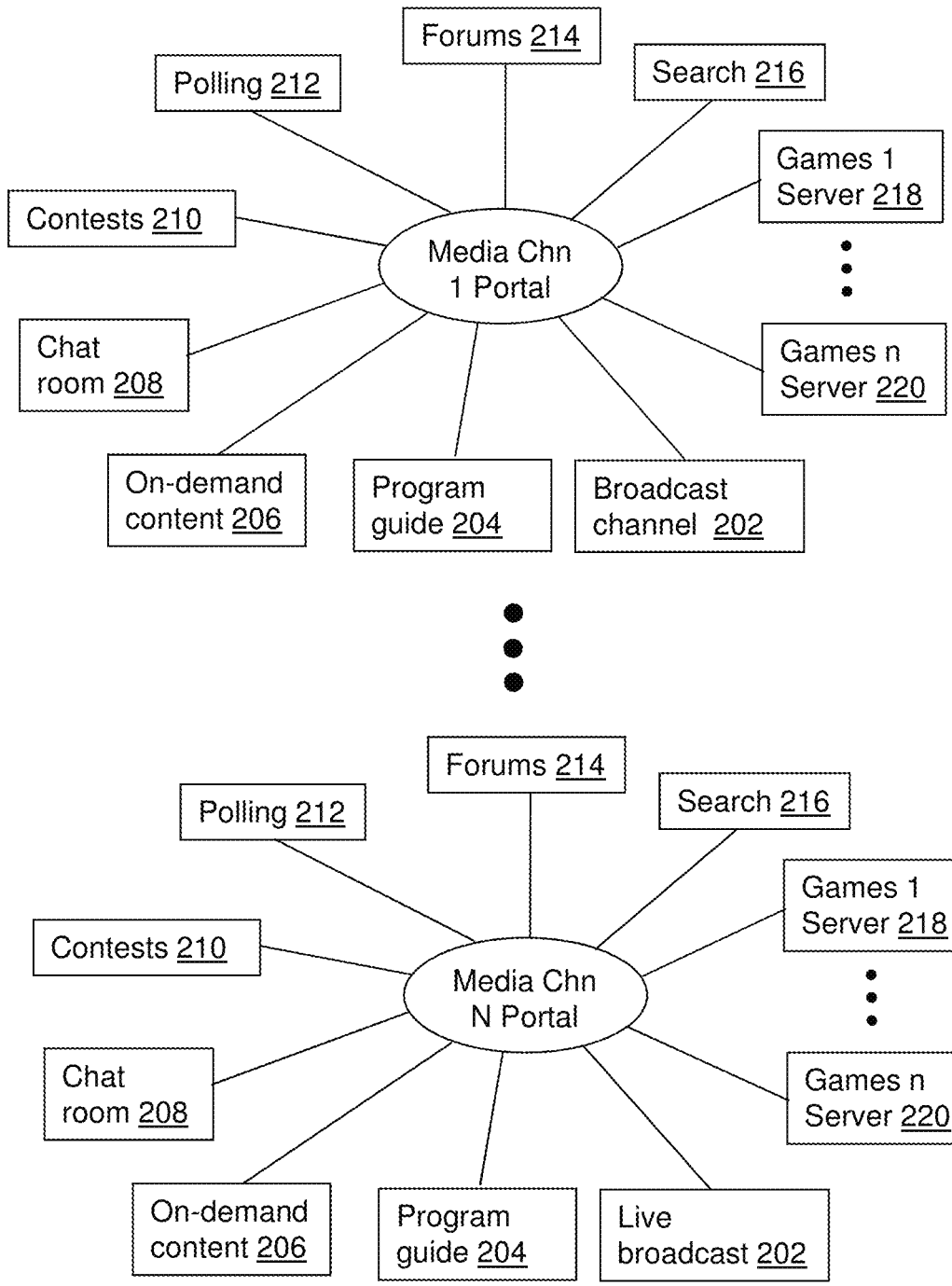
FIG. 2 depicts an exemplary embodiment of media portals contextually associated with a multimedia broadcast channel delivered by the communication system to subscribers.

FIG. 2 depicts an exemplary embodiment 200 of the media portals. In this illustration, each a portal can aggregate a variety of services that are contextually associated with a specific broadcast channel. For example, for the Nickelodeon™ channel, the portal can include: a program guide 204 tailored to said channel; on-demand content 206 of previously broadcast Nickelodeon™ programs; a chat room 208 for exchanging views on shows, content, characters, etc.; contests 210 to engage subscribers in competitive events associated with Nickelodeon; polling services 212 to monitor subscriber needs and biases; forums 214 in which subscribers can join organizations or groups of like-minded subscribers; a search engine for exploring topics related to Nickelodeon programs, characters, shows in the making, movies, and so forth; and an assortment of video games such as a game for Jimmy Neutron™, a game for Sponge Bob Square Pants™, etc.

The media channel "N" portal depicted in FIG. 2 is a duplicate copy of the media channel "1" portal for illustration purposes only. In practice, it is expected that by contextually tailoring each portal to a broadcast channel that said portals will vary in the media services they offer. For example, a C-SPAN viewer may not be interested in games, or contests. Instead such viewers may want to see media service links for local, national, and international news. Hence, FIG. 2 in practice would likely show disparate embodiments for each of the media service portals.

Figure 3:
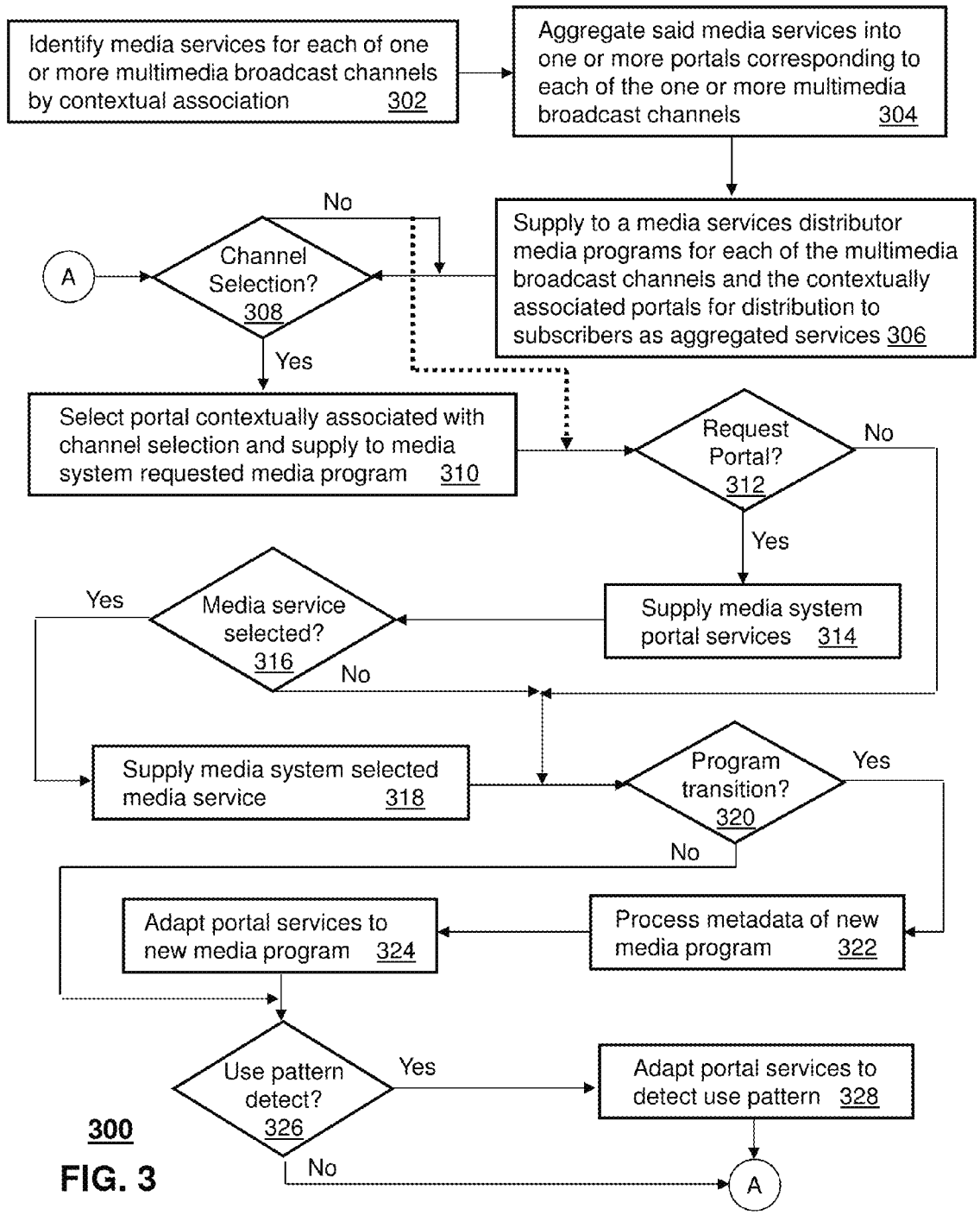
FIG. 3 depicts an exemplary method operating in portions of the communication system.

FIG. 3 depicts an exemplary method 300 operating in portions of the communication system 100. Method 300 begins with step 302 in which a number of service providers of one or more multimedia broadcast channels contextually identifies media services for each of said broadcast channels (such as shown in FIG. 2). In step 304, each broadcast service provider aggregates by common means the media services they have identified into a web services portal which they have assigned to a corresponding multimedia channel (e.g., a portal for Nickelodeon, a portal for MTV, a portal for CBS, a portal for CSPAN, and so on).

Once a portal has been established for each multimedia channel, each broadcast service provider supplies in step 306 to a media services distributor (e.g., Comcast, AT&T) media programming (i.e., regular 24-7 episode programming and advertisements) of a multimedia broadcast channel and the contextually associated portal for said channel for distribution to subscribers of the IPTV communication system 100 as an aggregated service.

Once the broadcast channels and associated portals have been distributed, an STB 106 in step 308 can be programmed to monitor a channel selection directed by a request submitted by a media controller 107. Once a selection is detected, the STB 106 can be programmed to present in step 310 media programming of the select channel and can as a background process select the portal that is contextually associated with said channel for future viewing. The portal selection of step 310 can be based on metadata that is retrieved by the STB 106 from the broadcast channel, or by way of provisioning information that is periodically supplied to the STB by one of the IPTV subsystems of the communication system 100.

The metadata or provisioning information can include a table that associates a channel with its portal, subscription information defining whether the subscriber can access said portal, and portal information such as a Uniform Resource Locator (URL) and if desired authentication data to securely access the portal. The media services distributor can choose to charge subscribers for supplying contextual portals, or can provide said services free of charge based on subsidization by the service providers of the broadcast channels.

In step 312, the STB 106 can monitor a request for viewing the portal associated with the selected broadcast channel. This request can be received as a selection made by a subscriber on the media controller 107 (e.g., selecting a portal button on the remote controller). Alternatively, the request for the portal can be prompted from detecting a request to change broadcast channels at step 308. In this embodiment, the portal can be invoked automatically prior to allowing a change of broadcast channels as a means to retain viewership with the previously selected broadcast service provider (e.g., Nickelodeon). The level of resistance applied by steps 308, 312 to allow a change of broadcast channels can be varied by the service provider of the IPTV system 100. That is, to leave the portal once entered the end user can be asked to request a departure from said portal by way of one or more soft keys selectable from the media controller 107. This approach effectively requires at least two or more actions by the end user to effectuate a switch between broadcast channels. A service provider of the IPTV system 100 can selectively charge fees to broadcast channel service providers for a level of resistance added to steps 308 and 312 to depart the contextual portal supplied thereby.

If the media controller 107 has a display, the STB 106 can be programmed to present in step 314 the portal service selected at the media controller 107 without interruption to the media program displayed at the media device 108. Alternatively, the STB 106 can present the portal at the media device concurrently with the media program being viewed. In yet another embodiment, the STB 106 can present the portal at the media device 107 in place of the media program being viewed. In step 316, the STB 106 monitors for selection of a media service of the portal. If no selection is made, the STB 106 proceeds to step 320. Otherwise, in step 318 the STB 106 presents the selected media service at the media controller 107 or media device 108 according to one of the aforementioned presentation embodiments of step 314.

Steps 320-328 can serve as supplemental embodiments to enhance the media services supplied by the communication system 100. In step 320, for example, a service provider of a particular broadcast channel can program its portal web server to monitor a transition between media programs of a corresponding channel (e.g., Sponge Bob ends and Jimmy Neutron begins). Upon detecting a program transition such as by receiving at the portal a message transmitted by the broadcast system, the portal can be programmed to retrieve metadata in step 322 from the broadcast channel for the new media program, and adapt in step 324 some or all of the media service links of the portal to said new media program. By way of steps 320-324, the portal can adapt itself to offer media links specifically tailored to a Sponge Bob Square Pants show, while different media service links can be presented during a Jimmy Neutron show.

In yet another supplemental embodiment, the plurality of portals can be programmed to receive in step 326 programming selections collected by the IPTV communication system 100 over a suitable periodic cycle (per day, per week, or month). The collected data can be processed by the portal using any common or future pattern recognition method (e.g., regression analysis) that can detect and/or predict use patterns. The use patterns can be categorized as demographic and/or psychographic patterns of subscribers, which the portals can utilize to adapt media services of said portal in step 328 to better match subscriber demand.

To more readily target subscribers, the portals can also selectively perform pattern recognition analysis on like broadcast channels (Disney versus Nickelodeon versus Cartoon Channel) to detect subscriber needs of a specific category and age group. Generally, the program selections collected from subscribers can be anonymous. For certain subscribers who accept program selection monitoring as an enhanced service feature, the portal can be programmed to adapt to each subscriber who has opted into this form of monitoring. In this latter case, the STB 106 in steps 310-318 can be provisioned to access a portal account that is tailored to the subscriber. Collecting program selections and distributing such information to the portals can be an additional source of revenue for the media distributor.

From step 328, method 300 repeats the foregoing steps starting at step 308. Note that once an initial broadcast channel is selected after, for example, power cycle of a media device 108, step 308 adapts so that step 312 proceeds step 308 when no program selections are detected. At steps 312, 320 and 326 portal requests, program transitions, and user pattern detection are processed at periodic intervals while monitoring program selections in steps 308.

From the enhanced presentation techniques of method 300 broadcast channel service providers can reasonably expect to augment the number of viewers who select their channel, and the duration of viewership. This helps broadcast service providers to increase advertisement revenue from sponsors who are willing to pay higher fees to attract consumers. Media distributors (like AT&T) can also benefit from method 300 by charging broadcast channel service providers for distributing contextual portals to its subscribers and for supplying subscriber behavior such as in step 326. In some instances, the media distributors can also host web servers for the portals as a way to provide a unified look and feel to its subscribers, and to derive additional revenue from the broadcast service providers.

From the foregoing descriptions, it would be evident to an artisan with ordinary skill in the art that the aforementioned embodiments can be modified, reduced, or enhanced without departing from the scope and spirit of the claims described below. For example, some or a portion of the processing described for method 300 can be redistributed at different portions of communication system 100. Also, customized contextual portals can be supplied to each VHO rather than the SHS as a means for broadcast service providers to present focused regional or State services. The STBs 106 can also be programmed to perform program selection collection and pattern recognition detection which can be supplied to the portals for adaptation in steps 326-328. The supplemental embodiments of steps 320-328 can be removed or modified without adversely affecting operations of the present disclosure. These are but a few examples of how the embodiments described herein can be updated without altering the scope of the claims below. Accordingly, the reader is directed to the claims for a fuller understanding of the breadth and scope of the present disclosure.

Figure 4:
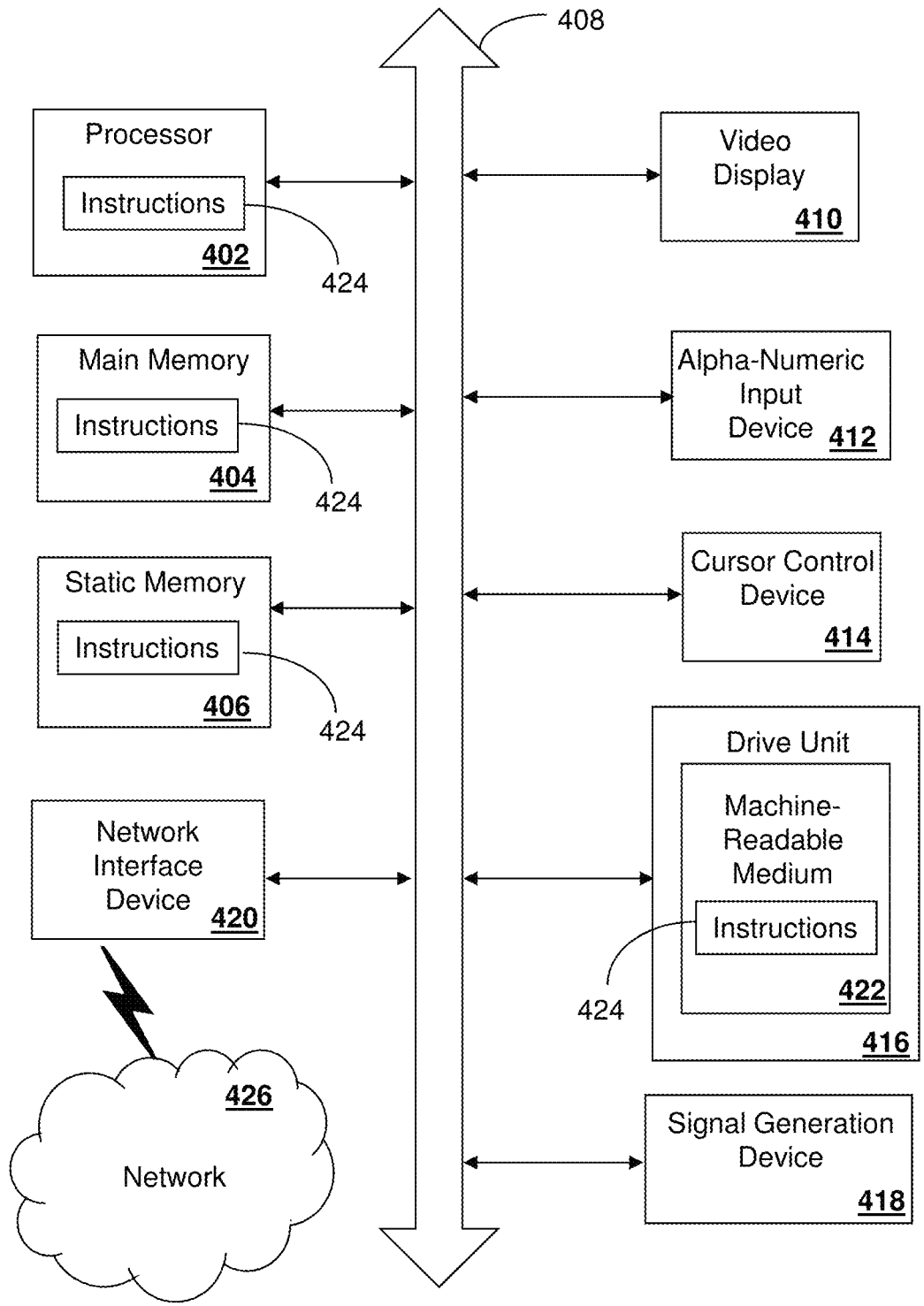
FIG. 4 is a diagrammatic representation of a machine in the form of a computer system within which a set of instructions, when executed, may cause the machine to perform any one or more of the methodologies discussed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display or LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions, which when executed by a processor, cause the processor to perform operations comprising:
    presenting at a media system a first media program supplied by a first multimedia broadcast channel;
    selecting as a background process an aggregated service of selectable media services of a portal contextually associated with the first media program supplied in the first multimedia broadcast channel;
    presenting at the media system the selectable media services of the portal upon detecting a first request to change the first multimedia broadcast channel to a second multimedia broadcast channel in order to retain viewership of the first multimedia broadcast channel;
    transitioning from the first multimedia broadcast channel to the second multimedia broadcast channel upon detecting a second request to depart from the presentation of the selectable media services of the portal; and
    upon transitioning to the second multimedia broadcast channel, causing the portal to adapt in whole or in part the selectable media services offered at the portal responsive to a second media program supplied by the second multimedia broadcast channel, wherein the portal adapts to the second media program based on metadata supplied by the second multimedia broadcast channel to modify the selectable media services, wherein the metadata is associated with the second media program,
    wherein the media system comprises a media device and a media controller that manages operations of the media device, and
    wherein the portal further adapts in whole or in part the selectable media services according to monitored demographic or psychographic patterns of usage at the media system.

2. The non-transitory computer-readable storage medium of claim 1, wherein the o selectable media services are presented concurrently with the first media program supplied by the first multimedia broadcast channel responsive to receiving a signal initiated by the media controller responsive to a selection of a portal button at the media controller.

3. The non-transitory computer-readable storage medium of claim 1, wherein the operations further comprise presenting at a display of the media controller the selectable media services of the portal.

4. The non-transitory computer-readable storage medium of claim 3, wherein the operations further comprise presenting at the media device the first media program supplied by the first multimedia broadcast channel uninterrupted by the selectable media services presented at the display of the media controller.

5. The non-transitory computer-readable storage medium of claim 1, wherein the usage is determined at least in part from media programming selections.

6. The non-transitory computer-readable storage medium of claim 1, wherein the media device is a set-top box.

7. The non-transitory computer-readable storage medium of claim 1, wherein the first multimedia broadcast channel is supplied by one of a digital media programming system or an analog media programming system.

8. The non-transitory computer-readable storage medium of claim 1, wherein the selectable media services comprise one of a contest, a polling service, a game, media services contextually associated with the first multimedia broadcast channel, or combinations thereof.

9. The non-transitory computer-readable storage medium of claim 1, wherein the first multimedia broadcast channel distributes media programs according to one of a multicast transmission or a unicast data transmission.

10. A media system, comprising:
    a memory to store instructions; and
    a controller element coupled to the memory, wherein upon executing the instructions, the controller element performs operations comprising:
    contextually associating a plurality of portals with a corresponding plurality of multimedia broadcast channels as an aggregated service offering;
    presenting a first media program of a first multimedia broadcast channel;
    selecting as a background process a first portal of the plurality of portals contextually associated with the first media program of the first multimedia broadcast channel, wherein the first portal is selected according to first metadata supplied by the first multimedia broadcast channel, and wherein the first metadata comprises a first uniform resource locator and first authentication information for securely accessing the first portal;
    presenting selectable media services of the first portal upon detecting a first request to transition from the first multimedia broadcast channel to a second multimedia broadcast channel in order to retain viewership of the first multimedia broadcast channel;

transitioning from the first multimedia broadcast channel to the second multimedia broadcast channel upon detecting a second request to depart from the first portal; and selecting as the background process a second portal of the plurality of portals contextually associated with a second media program of the second multimedia broadcast channel, wherein the second portal is selected according to second metadata supplied by the second multimedia broadcast channel, and wherein the second metadata comprises a second uniform resource locator and second authentication information for securely accessing the second portal wherein each of the plurality of portals supply the media system selectable media services contextually associated with a corresponding one of the plurality of multimedia broadcast channels, and wherein the selectable media services of the first portal comprise one of a contest, a polling service, a game, media services contextually associated with the first multimedia broadcast channel, or combinations thereof.

11. The media system of claim 10, wherein the media system comprises a set top box.

12. The media system of claim 10, wherein the operations further comprise receiving information for contextually associating the plurality of portals with the plurality of multimedia broadcast channels.

13. The media system of claim 12, wherein the information comprises one of a list that identifies an association between the plurality of portals and the plurality of multimedia broadcast channels, subscriber information, or access information for each of said plurality of portals.

14. The media system of claim 12, wherein the information is incrementally collected as portal information from a select one of the plurality of multimedia broadcast channels.

15. A server, comprising:
a memory to store instructions;
a controller coupled to the memory, wherein upon executing the instructions the controller performs operations comprising:
presenting at a media system services of a portal contextually associated with a first multimedia broadcast channel upon detecting a first request to transition from the first multimedia broadcast channel to a second multimedia broadcast channel to retain viewership of the first multimedia broadcast channel;
transitioning from the first multimedia broadcast channel to the second multimedia broadcast channel upon detecting a second request to depart from the presentation of the services of the portal; and
upon transitioning to the second multimedia broadcast channel,
contextually adapting the services of the portal to the second multimedia broadcast channel, and
adapting the services according to monitored demographic or psychographic patterns of usage at the media system,
wherein the media system comprises a media device and a media controller that manages operations of the media device.

16. The server of claim 15, wherein the operations further comprise adding services to the portal that are contextually associated with the second multimedia broadcast channel.

17. The server of claim 15, wherein the first multimedia broadcast channel is supplied by one of a digital media programming system or an analog media programming system.

18. The server of claim 15, wherein the services comprise one of a contest, a polling service, a game, or media services contextually associated with the first multimedia broadcast channel.

19. The server of claim 15, wherein the media device is a set-top box.

20. The server of claim 19, wherein the media controller is a remote controller of the set-top box.

* * * * *